US008612262B1

United States Patent
Condon et al.

(10) Patent No.: US 8,612,262 B1
(45) Date of Patent: Dec. 17, 2013

(54) MARKET RELATIONSHIP MANAGEMENT

(75) Inventors: Michael H. Condon, River Forest, IL (US); Randall M. Hanson, Grayslake, IL (US); Kent Alan Rawlins, Cedar Lake, IN (US)

(73) Assignee: Allstate Insurance Company, Northbrook, IL (US)

( * ) Notice: Subject to any disclaimer, the term of this patent is extended or adjusted under 35 U.S.C. 154(b) by 1411 days.

(21) Appl. No.: 11/417,468

(22) Filed: May 4, 2006

Related U.S. Application Data

(63) Continuation-in-part of application No. 10/988,623, filed on Nov. 16, 2004, now abandoned.

(60) Provisional application No. 60/520,981, filed on Nov. 19, 2003.

(51) Int. Cl.
*G06Q 40/00* (2012.01)

(52) U.S. Cl.
USPC ....... 705/4; 705/10; 705/12; 705/26; 709/223

(58) Field of Classification Search
USPC .................. 705/4, 10–12, 14, 26, 35–45, 80; 709/223
See application file for complete search history.

(56) References Cited

U.S. PATENT DOCUMENTS

| | | | |
|---|---|---|---|
| 5,671,141 A | | 9/1997 | Smith |
| 5,950,169 A | * | 9/1999 | Borghesi et al. .................. 705/4 |
| 6,070,155 A | | 5/2000 | Cherrington |
| 6,397,131 B1 | | 5/2002 | Busch et al. |
| 6,418,436 B1 | | 7/2002 | Degen |
| 6,502,030 B2 | | 12/2002 | Hilleary |
| 6,847,992 B1 | * | 1/2005 | Haitsuka et al. .............. 709/218 |
| 6,871,181 B2 | * | 3/2005 | Kansal .............. 705/4 |
| 6,983,311 B1 | * | 1/2006 | Haitsuka et al. .............. 709/217 |
| 7,013,284 B2 | | 3/2006 | Guyan et al. |
| 7,092,898 B1 | | 8/2006 | Mattick |
| 7,096,193 B1 | * | 8/2006 | Beaudoin et al. ............ 705/26.1 |
| 7,124,088 B2 | | 10/2006 | Bauer |
| 7,401,025 B1 | * | 7/2008 | Lokitz ........................ 705/346 |
| 7,660,725 B2 | | 2/2010 | Wahlbin |

(Continued)

FOREIGN PATENT DOCUMENTS

| | | |
|---|---|---|
| CA | 2371703 | 11/2000 |
| EP | 1688880 | 8/2006 |

(Continued)

OTHER PUBLICATIONS

Subjectivity and the Weighting of Performance Measures: Evidence from a Balanced Scorecard; Christopher D. Ittner, David F. Larcker and Marshall W. Meyer; The Accounting Review vol. 78, No. 3, Jul. 2003 725-758.*

(Continued)

*Primary Examiner* — Robert Niquette
(74) *Attorney, Agent, or Firm* — Banner & Witcoff, Ltd.

(57) ABSTRACT

A system and method for managing an insurance company's relationships with service providers is disclosed. Data about a service provider's performance is obtained for a variety of metrics. Performance rating models and business rules may be used to evaluate the data and to rate the performance of service providers. The resultant ratings can be used as a basis for recommending service providers to customers. Feedback may be provided to the service providers so as to inform them of their competitive position relative to other service providers.

14 Claims, 5 Drawing Sheets

(56) References Cited

U.S. PATENT DOCUMENTS

| | | | |
|---|---|---|---|
| 7,844,491 B1* | 11/2010 | Haitsuka et al. | 705/14.4 |
| 2001/0032172 A1* | 10/2001 | Moulinet et al. | 705/37 |
| 2001/0044743 A1* | 11/2001 | McKinley et al. | 705/14 |
| 2001/0049638 A1* | 12/2001 | Satoh | 705/26 |
| 2001/0051911 A1* | 12/2001 | Marks et al. | 705/37 |
| 2002/0019786 A1* | 2/2002 | Gonzalez et al. | 705/28 |
| 2002/0035488 A1* | 3/2002 | Aquila et al. | 705/4 |
| 2002/0098848 A1 | 7/2002 | Bamburak et al. | |
| 2002/0128877 A1 | 9/2002 | Levit | |
| 2002/0165739 A1 | 11/2002 | Guyan et al. | |
| 2002/0184075 A1* | 12/2002 | Hertz et al. | 705/10 |
| 2002/0188479 A1 | 12/2002 | Renwick et al. | |
| 2003/0009357 A1 | 1/2003 | Pish | |
| 2003/0014297 A1* | 1/2003 | Kaufman et al. | 705/9 |
| 2003/0023473 A1 | 1/2003 | Guyan et al. | |
| 2003/0115129 A1* | 6/2003 | Feaver et al. | 705/37 |
| 2003/0120583 A1* | 6/2003 | Olson et al. | 705/37 |
| 2003/0145124 A1 | 7/2003 | Guyan et al. | |
| 2003/0154111 A1* | 8/2003 | Dutra et al. | 705/4 |
| 2003/0154123 A1* | 8/2003 | Subbloie et al. | 705/11 |
| 2003/0154172 A1 | 8/2003 | Guyan et al. | |
| 2003/0158924 A1* | 8/2003 | DeLegge | 709/223 |
| 2003/0171975 A1* | 9/2003 | Kirshenbaum et al. | 705/10 |
| 2003/0187691 A1* | 10/2003 | Dutt et al. | 705/2 |
| 2003/0233261 A1 | 12/2003 | Kawahara et al. | |
| 2004/0019553 A1* | 1/2004 | Setz et al. | 705/37 |
| 2004/0030587 A1 | 2/2004 | Danico et al. | |
| 2004/0044563 A1* | 3/2004 | Stein | 705/10 |
| 2004/0049450 A1* | 3/2004 | Lussler | 705/38 |
| 2004/0059628 A1* | 3/2004 | Parker et al. | 705/12 |
| 2004/0098287 A1* | 5/2004 | Young et al. | 705/5 |
| 2004/0107131 A1* | 6/2004 | Wilkerson et al. | 705/10 |
| 2004/0111302 A1 | 6/2004 | Falk et al. | |
| 2004/0158497 A1* | 8/2004 | Brand | 705/26 |
| 2004/0193515 A1* | 9/2004 | Peterson et al. | 705/30 |
| 2004/0225535 A1* | 11/2004 | Bond, Jr. et al. | 705/4 |
| 2005/0108063 A1 | 5/2005 | Madill, Jr. et al. | |
| 2005/0108065 A1 | 5/2005 | Dorfstatter | |
| 2005/0149376 A1 | 7/2005 | Guyan et al. | |
| 2005/0192867 A1* | 9/2005 | Haitsuka et al. | 705/14 |

FOREIGN PATENT DOCUMENTS

| | | | |
|---|---|---|---|
| WO | WO 98/49642 | * 11/1998 | G06F 17/60 |
| WO | 9922330 | 5/1999 | |
| WO | 0067180 | 11/2000 | |
| WO | 0067181 | 11/2000 | |
| WO | 0067182 | 11/2000 | |
| WO | 0067184 | 11/2000 | |
| WO | 0067186 | 11/2000 | |
| WO | 0180128 | 10/2001 | |
| WO | WO0215079 | 2/2002 | |

OTHER PUBLICATIONS

Patrick Butler, National Organization for Women; "Automobile Insurance Pricing: Operating Cost versus Ownership Cost; the Implications for Women"; Women's Travel Issues; Proceedings from the Second National Conference; pp. 737-751, 1996.

C. Apte, E. Grossman, E. Pednault, B. Rosen, F. Tipu and B. White; IBM Research Report RC-21483; "Probalistic Estimation Based Data Mining for Discovering Insurance Risks,"; pp. 1-19; Sep. 13, 1999.

Marty Ellingsworth; http://financial-serv.section.informs.org/IFB_MartyElls.pdf; "Detecting Suspicious Claims and Uncovering Fraud and Abuse"; Nov. 7, 2002.

"Process Claims Uses Web to Speed Solutions," http://www.processciaims.com/press_releases/Mar2403.htm; Mar. 24, 2003.

"Upgrading Claims Processing IT: New Claims Technology Value Chain can Deliver Efficiency and Savings," http://www.bearingpoint.com/portal/binary/com.epicentric.contentmanagement.servlet. ContentDeliveryServlet/published/pdfs/public/CP1075-IT-SpecialReport.pdf, Aug. 2005.

"What is an Actuary?"; http://www.beanactuary.org/about/whatis.cfm; © 2005 Be an Actuary Web Site.

International Search Report mailed Dec. 31, 2001.

Online Insurance Shopping Increasingly Popular, by Martin J. Moylan, et al., News & Observer, Raleigh, NC, Final Ed., p. E6. Oct. 31, 1999.

The Web's New Wave, by Sally Praskey Canadian Insurance, Feb. 2000, vol. 105, No. 2, pp. 14-16.

Insurance E-Commerce . . . Still Promise, Not Performance. (Statistical Data Inclided) by Donald R. Jackson. Directed Marketing. Dec. 1999, vol. 62, No. 8, p. 38.

Automatic Answer. (automation of insurance claims) by Sally Whitney. Best's Reveiw, Sep. 2000, vol. 101, No. 5, pp. 133-136.

Insurers Selling Online Must Update Back-Office Process; Copyright 2006 by A.M. Best Company, Inc.; Bestwire—Nov. 23, 1998.

Laying the foundation: the service-oriented architecture by Carol Weiszmann, p. s18, http://www.bearingpoint.com/portal/binary/com.epicentrio.contentmanagement.servlet. ContentDeliveryServlet/published/pdfs/public/CP1075-IT-SpecialReport.pdf, Aug. 2005.

SOA Standards that matter by Carol Weiszmann, p. 53, http://www.bearingpoint.com/portal/binary/com.epicentric.contentmanagement.servlet.ContentDeliveryServlet/published/pdfs/public/CP1075-IT-SpecialReport.pdf, Aug. 2005.

Next Generation Systems Revolutionize Claims Management, by Michael Risley and Raymond August, p. S4http://www.bearingpoint.com/portal/binary/com.epicentric.contentmanagement.servlet. ContentDeliveryServlet/published/pdfs/public/CP1075-IT-SpecialReport.pdf, Aug. 2005.

Integrated Claims Processing Technology Can Produce Significant ROI by Robert Schwartz, p. S8, http://www.bearingpoint.com/portal/binary/com.epicentric.contentmanagement.servlet. ContentDeliveryServlet/published/pdfs/public/CP1075-IT-SpecialReport.pdf, Aug. 2005.

Intelligent Claims Automation by Peter Lynch, p. S6, http://www.bearingpoint.com/portal/binary/com.epicentric.contentmanagement.servlet.ContentDeliveryServlet/published/pdfs/public/CP1075-IT-SpecialReport.pdf, Aug. 2005.

Efficient and Cost-Effective Regulatory Compliance by Dan Grey, p. S10, http://www.bearingpoint.com/portal/binary/com.epicentric.contentmanagement.servlet.ContentDeliveryServlet/published/pdfs/public/CP1075-IT-SpecialReport.pdf, Aug. 2005.

Time to Bring Innovation to the Operational 'Experience' by Kevin S. Kelly, p. S12, http://www.bearingpoint.com/portal/binary/com.epicentric.contentmanagement.servlet.ContentDeliveryServlet/published/pdfs/public/CP1075-IT-SpecialReport.pdf, Aug. 2005.

Addressing The Major Challenges Facing Insurers by Dan Elias, p. S16, http://www.bearingpoint.com/portal/binary/com.epicentric.contentmanagement.servlet.ContentDeliveryServlet/published/pdfs/public/CP1075-IT-SpecialReport.pdf, Aug. 2005.

Claims Initiatives: Rewarding Results by Mike Key, p. 514, http://www.bearingpoint.com/portal/binary/com.epicentric.contentmanagement.servlet.ContentDeliveryServlet/published/pdfs/public/CP1075-IT-SpecialReport.pdf, Aug. 2005.

Increase Productivity and Detect Fraud Effectively by Vincent Ciadella, p. S23, http://www.bearingpoint.com/portal/binary/com.epicentric.contentmanagement.servlet.ContentDeliveryServlet/published/pdfs/public/CP1075-IT-SpecialReport.pdf, Aug. 2005.

Applying Business Process Modeling by Carol Weiszmann, p. S20, http://www.bearingpoint.com/portal/binary/com.epicentric.contentmanagement.servlet.ContentDeliveryServlet/published/pdfs/public/CP1075-IT-SpecialReport.pdf, Aug. 2005.

Office Action mailed Nov. 19, 2012 from U.S. Appl. No. 11/361,933.

Prosecution History from U.S. Appl. No. 11/361,346.

Prosecution History from U.S. Appl. No. 11/361,933.

Prosecution History from U.S. Appl. No. 10/988,623.

* cited by examiner

MARKET RELATIONSHIP MANAGEMENT

This application is a continuation-in-part of U.S. Non-Provisional application Ser. No. 10/988,623, entitled "Systems and Methods for Managing Insurance Claims" filed Nov. 16, 2004, which claims benefit from U.S. Provisional Application No. 60/520,981, entitled "Methods and Systems for Providing an Express Repair Link for Vehicles" filed Nov. 19, 2003. The disclosures of both applications are expressly incorporated herein by reference in their entirety.

FIELD OF THE INVENTION

Aspects of the invention relate generally to rating performance of service providers, more particularly to ranking service providers according to their performance rating relative to their peers.

DESCRIPTION OF RELATED ART

The resolution of an insurance claim typically begins with a customer reporting a loss to the insurance company. During this process, known as first notice of loss (FNOL), the customer provides facts about the loss, either to a representative of the insurance company or through a self-service interface such as a web site. If resolution of the claim requires a service, such as vehicle repair, the customer may need or want the insurance company to recommend a service provider. In some cases, the customer may have little information on which to make an informed choice with respect to customer satisfaction, location, quality, or other factors.

As can be appreciated, an insurance company wants to recommend service providers that are known to meet acceptable quality standards and provide good value. This is one reason some automobile insurance companies have a direct repair program (DRP), which enrolls vehicle repair shops known to meet standards established by the insurance company. For example, these standards may include somewhat stringent criteria regarding equipment, training, licensing, and management practices. Not all vehicle repair shops want to invest the time and money in systems, tooling, and personnel training needed to qualify for a DRP. And some repair shops claim to provide superior service without the need to meet DRP requirements. This illustrates a need in the insurance industry for a means of measuring and rating service providers to identify those that regularly provide relatively high levels of customer satisfaction, quality, efficiency, etc. Furthermore, the industry has a need to make those high-performing service providers known to insurance customers by some means such as a list of service providers in a particular local market ranked in order of performance rating.

Another need in the art is to method make service provider programs, such as DRPs, more accessible to all service providers by lowering the barriers to entry for new participants. When combined with a means of transparently rating service provider performance, such a program would make better use of free market forces to drive innovations and improvements in customer experience, quality, efficiency, etc.

SUMMARY

The following represents a simplified summary of some embodiments of the invention in order to provide a basic understanding of various aspects of the invention. This summary is not an extensive overview of the invention nor is it intended to identify key or critical elements of the invention or to delineate the scope of the invention. Its sole purpose is to present some embodiments of the invention in simplified form as a prelude to the more detailed description that is presented thereafter.

A method is disclosed for managing an insurance company's relationships with service providers in a way that promotes competition and provides customers with fact-based recommendations. Service provider performance data is collected and a service provider performance rating may be determined for each service provider. The performance rating may be provided to the service providers so that the service provides receive feedback on their respective performance ratings. The service providers may be categorized in a plurality of levels where the categorization determines whether the service provider is recommended to the customer. In response to a customer's first notice of loss, a list of recommended service providers may be determined, based in part on the performance rating of each service provider in a local market. If the customer rejects the most recommended service provider, additional service providers may be provided to the customer in order of their service rating until the customer selects a service provider.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

Aspects of the present invention may take physical form in certain parts and steps, embodiments of which will be described in detail in the following description and illustrated in the accompanying drawings that form a part hereof, wherein.

DETAILED DESCRIPTION

Figure 1:
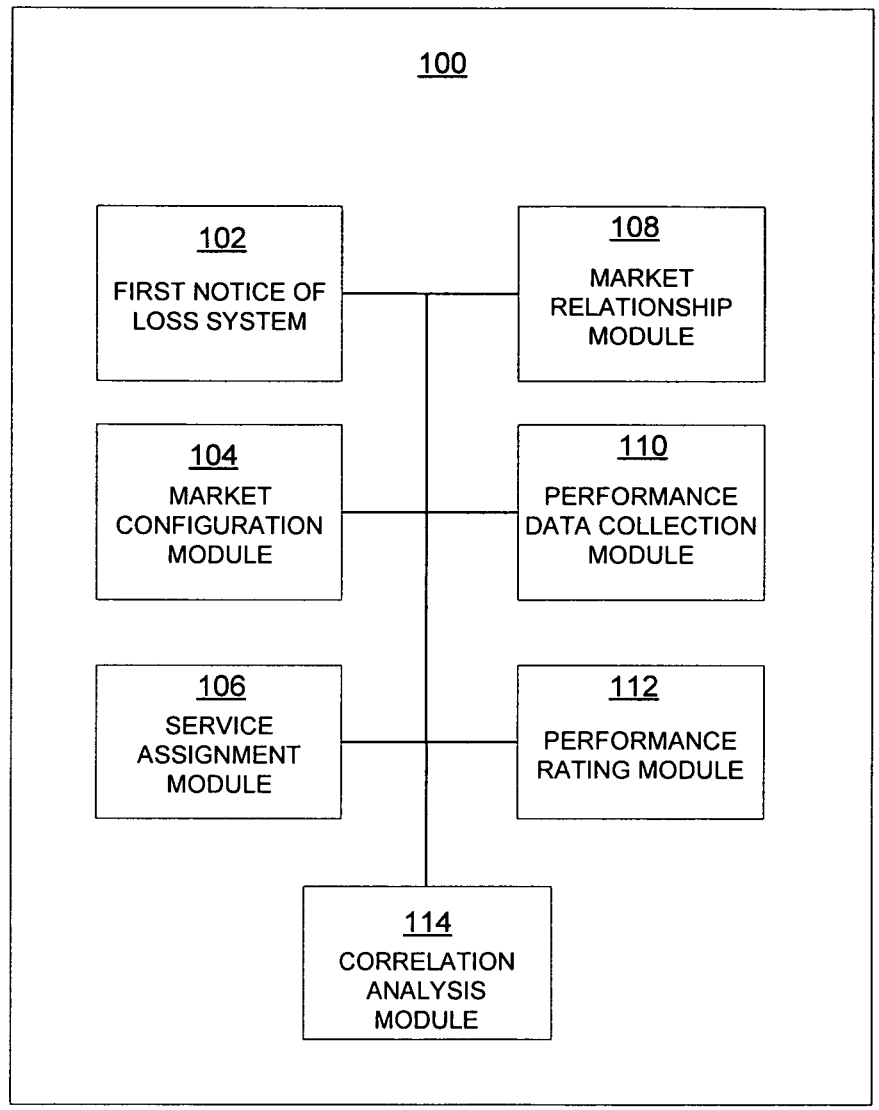
FIG. 1 illustrates a schematic block diagram of computer modules that may be used to select a service provider.

In the detailed description to follow, systems and methods are disclosed that may be used for market relationship management. The process of managing a relationship may include calculating a performance rating of a service provider, adding the calculated rating to the service provider's record, maintaining the service provider's record in a data set, such as a database, of service provider records, identifying those rated service providers that match a specified set of service needs, ordering (sorting) the said list by performance rating, and presenting some portion of the ordered list to a customer, with the customer's response triggering either presentations of additional suitable service providers or an assignment of a task to the service provider chosen by the customer.

As can be appreciated, market relationship management (MRM) systems can be useful in a variety of circumstances. One suitable application is the classification of automobile repair shops. As many individuals suffer relatively infrequent reasons to need automotive repairs due to collisions and the like, the potential customers may not have sufficient knowledge as to which repair shop in the vicinity would be suitable for use with a particular type of repair. This may also be true for damage to buildings, such as homes or businesses, which require repair. Therefore, providing a method of ranking various service providers can be useful. As can be appreciated, while any one individual is unlikely to suffer a particular type of loss, the likelihood of at least one individual in the same area suffering such a loss is much higher. Therefore, insurance companies are well suited to ascertaining quality service providers for a wide variety of applications, including but not limited to, vehicle insurance (including personal automobile, motorcycle, boat, and various commercial lines), homeowner insurance, renters insurance, commercial property insurance, workers compensation insurance, and other lines and insurance products. As can be appreciated, by collecting data on the various service providers, the service providers that provide a higher performance service will be given more work. This can allow the insurance company to use market forces to reward repair shops that do high quality work while providing incentives to service providers with lower performance ratings to improve their performance ratings. It should be noted that in the discussion that follows, a particular application may be described for the purpose of illustration. However, such discussion is for the purpose of describing potential uses of the invention and is not intended to limit the present invention's scope.

The MRM system described may interact with an insurance company's first notice of loss (FNOL) system to provide a customer with information that is useful in selecting a service provider suitable to resolve an insurance claim. The MRM system also comprises a computerized data set system that may be used to help manage a relationship between the insurance company and service providers for purposes that include rating the performance of the service providers relative to a standard and/or relative to one another. One or more service providers may be presented to a customer based on a compilation of performance rating data and calculated ratings relative to a given market. The information may be provided by displaying the information on a computer monitor, personal digital assistant (PDA), cell phone or other type of display screen suitable to display graphics. A list of one or more service providers may also be provided on printed matter or in the form of audio outputs such as an automated voice, or the information may be viewed by an insurance representative who then communicates it to the customer. It should be noted that in certain settings the customer may be a claimant, such as a policyholder or a third-party asserting a claim against the policyholder. However, a customer may also include, but is not limited to, family and friends of the policyholder, entities with an interest in a policy or damage claim, individuals who contact an insurer to settle/dispute a claim, a person with responsibility or authority for a vehicle or other property and equivalents thereof.

The MRM system may provide each participating service provider with feedback that includes the system's overall rating of their performance together with a breakdown of other rating metrics such as customer satisfaction, quality, efficiency, customer service index (CSI), process performance metrics, cost metrics, system compliance, and historical rating data. In addition, the system may generate a report that describes the service provider's areas of strength and weakness compared to other service providers in the local market.

As noted above, the MRM system rules tend to reward better performers with more referrals than lesser performers. By providing transparent rating information about the local market, service providers may make changes that may improve their performance and ratings.

In an embodiment, the MRM system may be used with respect to vehicle insurance claims. In an aspect of such an embodiment, the MRM system is used to recommend a collision repair shop that can both inspect a damaged vehicle and possibly repair it. In some instances, the insurance company may own the repair shop. In other instances, the insurance company may not own the repair shop. The insurance carrier may have relationships with repair shops based on the repair shops having met service and performance requirements in the past, for example.

An MRM system may include a data set of all service providers who have a business relationship with the insurance company and that may be eligible, based on various criteria, to be recommended to customers of the insurance company. This data set of service providers forms a "global market" from which the MRM system configures a "local market" of service providers for each instance in which the insurance company wants to recommend a service provider to a customer. Configuring a market of potentially suitable service providers refers to determining those service providers that are suitable from a geographical standpoint. The market may be configured in part by identifying rated service providers that share more advantageous geographical relationships as determined by a formula that may consider distance from a customer's home, distance from a customer's place of work, travel time, location of the damaged property, location of service providers with identified capabilities and capacities, and location of providers with an identified brand affiliation, if relevant, to the type of property damaged.

The MRM system may also define entry criteria for each local market according to business rules which may be determined nationally or regionally by the insurance company. The local market entry criteria may determine which service providers are to be considered for possible recommendation. Types of entry criteria for a local market may include:

- Geographic attributes, such as having a service location in a specified zip code or in a circle whose center is the customer's residence and whose radius is a specified distance (Typically a local market may require service providers that are conveniently located near a customer's residence, work, or customer-specified location.)
- Specified capabilities, equipment, training, specialization, or authorization (e.g., manufacturer authorization for repairs to their products)
- Compliance with all state and local business licensing requirements
- Price competitiveness relative to the local market
- Affiliation with a peer group, association, consolidator group, etc.
- Preference (on the part of the service provider) for a particular market niche or type of service, either generally or in association with the insurance company (e.g., repair of newer vehicles, older vehicles, or foreign or domestic brands; repair of particular types of damage such as small dent removal, automotive glass repair, theft specialty shops, and partial or complete auto restoration)
- A minimum volume of service requests fulfilled for the insurance company over a specified period of time
- A minimum performance rating that may be calculated by the MRM system as described herein or obtained from another source Availability to perform the requested service within a specified time frame, which may be known through a process by which service providers report availability to the insurance company.

This list is not intended to be limiting, but merely representative; thus other similar criteria may also be used.

The local market entry criteria may also be determined in part by terms in an insurance policy specifying that particular service provider types will be used to resolve a claim. For example, an automobile insurance policy may specify that inspections and/or repairs will be performed by repair shops with certain certifications or affiliations, or by repair shops or drive-in centers owned or operated by the insurance company.

The insurance company may vary local market entry criteria between different geographical areas or even in one area at different times based on variations in the local marketplace such as density of service providers in the area; total capacity of service providers in the area; the insurer's volume of business in the area (e.g., as measured by policies in force and/or claim volume); and total demand for services in the area by the insurance company or its customers.

Each service provider's profile in the global market data set contains data elements that indicate their distinctive attributes (capabilities, certifications, preferences, etc.), which may be used by the system to determine which service providers are suitable for a local market according to the entry criteria. The profiles may also specify terms, conditions, or service level agreements that the insurance company has negotiated with the service provider such as rates, discounts, response times, resolution times, and volume levels (e.g., a minimum volume of service requests that a service provider agrees to fulfill in a given time period).

In one embodiment, the MRM system may include a database that contains a substantial number of historical claim case files that may be analyzed and statistically associated to identify correlations of case attributes with a wide range of case outcomes. Case outcomes may be favorable or less than favorable. Successful outcomes may be identified by performance metrics for various factors that may include quality, customer satisfaction, and efficiency.

Case attributes may include loss attributes, policy attributes and service provider attributes. A correlation identification module may query the claim case database for outcomes that are shown to have a statistically significant association with attribute factors that result in improving desired outcomes. By identifying correlations among various case attributes and positive and negative outcomes, an insurance company may more effectively develop business rules for configuring local markets.

In one embodiment, a correlation analysis module may identify that a service provider with certain attributes S1, S2, S3 may have a greater probability of desired outcomes in cases that combine loss attributes L1, L2, L3 with policy attributes P1, P2, P3. The query may also reveal that the same service providers with attributes S1, S2, S3 may not be likely to have a favorable outcome in cases that combine policy attributes P1, P3, P6 with loss attributes L5, L6, L7.

For example, the correlation analysis module may identify a correlation that indicates that better outcomes occur in vehicle claim cases where the customer owns a Mercedes (P1) or BMW (P2) brand of vehicle; and where the loss is greater than $5,000 (L1); and where repair shops have an affiliation with the vehicle manufacturer (S1), a relatively high degree of shop cleanliness (S2), and a demonstrated ability to complete repairs when promised (S3).

Turning now to FIG. 1, a schematic embodiment of a MRM system 100 is illustrated that may be used with various lines of insurance, such as those which were listed earlier. It should be noted that the modules of the depicted system 100 define logical functions; thus the depicted modules may be combined into a single piece of software or may be composed of separate pieces of software that are remotely located from each other and that are configured to function in conjunction with other modules. As depicted, a customer provides information about an insurance claim to the insurance company through a first notice of loss (FNOL) system 102. The customer may provide this information to the insurance company by various means, including telephone, postal mail, email, online chat capability, Internet applications, third party services, other communication technology, or in person to any of various representatives of the insurance company (e.g., customer service representative or insurance company agent) or third party affiliates. As can be appreciated, if the customer provides the information through a self-service process, such as a telephone, kiosk, or computer connected to an insurance company system through a network, the customer may be able to obtain quicker service, depending on the availability of insurance agents or customer service representatives.

The FNOL system 102 is used to collect and manage information about the loss, particularly information provided by the customer. Once collected, the FNOL system 102 provides the market configuration module 104 with information that includes the type of service needed and may also include other information needed to configure a local market of service providers (e.g., geographic location of the customer's residence, type and extent of loss, or specialized services or attributes required of a service provider).

The market configuration module 104 uses the information received from the FNOL system 102 to define local market entry criteria according to predefined business rules. The module 104 may contain the business rules or may reference them in a different module or system (such as an enterprise rules engine). The business rules may be created using robust business rules software, through the hard-coding of business logic in software, or via other approaches known in the art, such as a business rule engine that accepts rules at higher levels of abstraction and transforms the rules into logical instructions that may be processed as standard software code. Business rules, such as requiring a service provider to provide a predetermined period of data before being recommended, depend on what the insurance company determines to be helpful and therefore may vary between regions and insurance companies.

The market configuration module 104 queries the market relationship module 108 to identify all service providers in the global market that are of the type specified and meet other local market entry criteria specified by the market configuration module 104. Examples of local market entry criteria were provided above.

The market relationship module 108 then creates a list of all service providers meeting the local market entry criteria and sends the list to the market configuration module 104. The list may include performance rating data for each service provider, or the market configuration module 104 may query the performance rating module 112 to obtain performance rating data for each service provider on the list. The market configuration module 104 then may sort the list of service providers based on their performance ratings to create a ranked list of service providers. In an embodiment, the market configuration module 104 may divide the list into two or more tiers, where each tier represents a range of performance ratings or relative percentiles (e.g., top 50% and bottom 50%). Additional tiers may be added as desired and other variables may also be used; for example, service providers could also be ranked according to other variables such as capacity.

The ranked list of service providers created by the market configuration module 104 is the local market configured specifically for the customer and the claim being processed. In an embodiment where the customer is working with a representative, either of the company or a third party, the market configuration module 104 may present the local market or a portion of the market to the representative providing the assistance. In a self-service embodiment, the market configuration module 104 may present the local market or a portion of it to the customer directly. In a self-service embodiment, the market configuration module 104 presents the highest-ranked service provider first and only displays subsequent service providers if the customer rejects the initial service provider.

In an alternative embodiment, the market configuration module 104 may present multiple service providers along with some sort of ranking (which may or may not be aligned with the service provider's performance score because a service provider with a high score may have limited availability). The rankings may include reordering the service providers based on appropriate criteria such as distance from work, distance from home, and availability. Alternatively, the customer may indicate that certain criteria are more important than others (such as availability or proximity to a location) during the initial data entry associated with the FNOL.

In another embodiment, the customer may want to consider all service providers within a specified geographical area. The system may then configure a local market that includes service providers with performance ratings as well as service providers who have not received ratings but are located within the specified geographic area. The resulting list of the local market displayed by the system may highlight or otherwise identify service providers with performance ratings from those that are not rated. In such a scenario, larger icons could be used for recommended service providers.

Once the customer has made a selection, the service assignment module 106 may assign the customer's service request to the selected service provider. The service assignment module 106 may also provide the customer with an appointment with the service provider. In addition, the service assignment module 106 may provide the customer with contact information.

Performance data collection module 110 collects and manages data needed to calculate performance ratings. The performance data collection module 110 captures data from one or more data sources, which may include data owned by the insurance company and/or third-party data sources. This captured data may pertain to a time period specified by the system (e.g., a specified week, month, or other time period).

Various embodiments may use different categories of performance data. Examples of performance data categories that may be used include: customer service index (CSI) (e.g., data provided by a third-party customer feedback service), cycle time metrics (e.g., elapsed time from receiving a service request or assignment to providing an estimate; elapsed time from receiving approval of an estimate to completing the service), quality metrics (e.g., "fit and finish" inspection results), cost metrics (e.g., variance from average costs for the same services in a local market), parts sourcing metrics (e.g., variance from industry sourcing patterns), estimating metrics (e.g., average variance of actual cost to original estimate) and system compliance (e.g., compliance with the insurance company's requests for transaction data or other information in a timely fashion).

Such categories may be subdivided further. For example, one or more categories of metrics (customer service index, cycle time, quality, cost, etc.) may be divided into subcategories of: vehicle age (e.g., 3 years or newer), type of policy (e.g., optional coverages or riders with the policy), vehicle brand (e.g., domestic, foreign), deductible amount (e.g., zero, low, medium), class of vehicle (e.g., economy, intermediate, luxury, truck), drivability (e.g., drivable or non-drivable), point of impact (e.g., damage located on the vehicle front end, side or rear end), total repair cost (e.g., ranges of cost), value of vehicle (e.g., economy, midrange and high), type of cost (e.g. parts, labor, outsourced services), type of activity (e.g., repair, replace, refinish), proximity to customer (e.g., from repair shop to customer residence), type of loss (e.g., theft, partial theft, collision, hail, glass) or combinations thereof.

The performance data collection module 110 may collect data from the service provider directly (e.g., in paper reports, electronic documents or files, or links to shop management systems) or from a third party. For example, a vehicle repair shop may use a shop management system that monitors repair process performance and provides performance data to the repair shop or others. Service providers may provide the insurance company with a wide variety of reports that contain data to be entered in the performance data collection module 110 and used by the performance rating module 112.

Service provider CSI data may be supplied by a third-party vendor which may provide periodic reports for the current time period and/or past periods. CSI data may include customers' responses to predetermined polling questions (e.g., "Would you recommend this service provider to your friends?").

Performance data regarding quality (e.g., so-called "fit and finish" evaluations) may be supplied to the performance data collection module 110 by qualified insurance company adjusters or third-party adjustors. Quality inspections may be performed at various times and for various reasons; examples include inspecting every vehicle repaired by a service provider; conducting random or spot inspections; conducting inspections for special circumstances (e.g., a vehicle with a hard to match paint color, which may be inspected for proper color matching and blending); verifying compliance with the vehicle manufacturer's assembly dimensions and tolerances; conducting inspections when determined by predefined business rules, which may be enabled by a computer-based business rules engine that may weigh factors associated with particular facts of a case. The inspections may occur while the vehicle is at the service provider's location or another location, either before or after the vehicle has been delivered to the customer. Quality ratings may also be obtained from service provider systems; for example, in one embodiment, quality data may include scores assigned by inspectors who inspect vehicles after they have been repaired (e.g., Pass and Fail exception codes).

The market relationship module 108 is used to establish and manage relationships with service providers. The activities enabled by the module 108 may include:

Enrolling a service provider in the insurance company's global market, thereby initiating a business relationship with the insurance company;

communicating performance metrics (e.g., calculating ratings, other calculated data, raw data) to service providers; and adjusting participation levels based on performance ratings or other criteria.

These activities will be described in more detail below.

The performance rating module 112 comprises one or more models used to calculate performance ratings based at least in part on data provided by the performance data collection module 110. The ratings may be expressed in one or more various forms, such as a numeric score or a classification. The ratings are used by the market configuration module 104 to rank a local market of service providers that meet the local market entry criteria. As noted earlier, the rating may also be part of the entry criteria; that is, the entry criteria may include a minimum required rating or may exclude service providers who have no rating yet. The performance rating module 112 may contain computer-executable instructions that express business rules that are used to convert input data into a final rating. The performance rating module 112 may also store ratings for a designated period of time such as a day, week, month, or indefinitely. An optional correlation analysis module 114, if provided, may function as discussed above and may provide input to the market configuration module 104. It should be noted that in an embodiment, the correlation analysis module 114 discussed above may be included in some other module such as the market configuration module or may be a separate module as shown.

Figure 2:
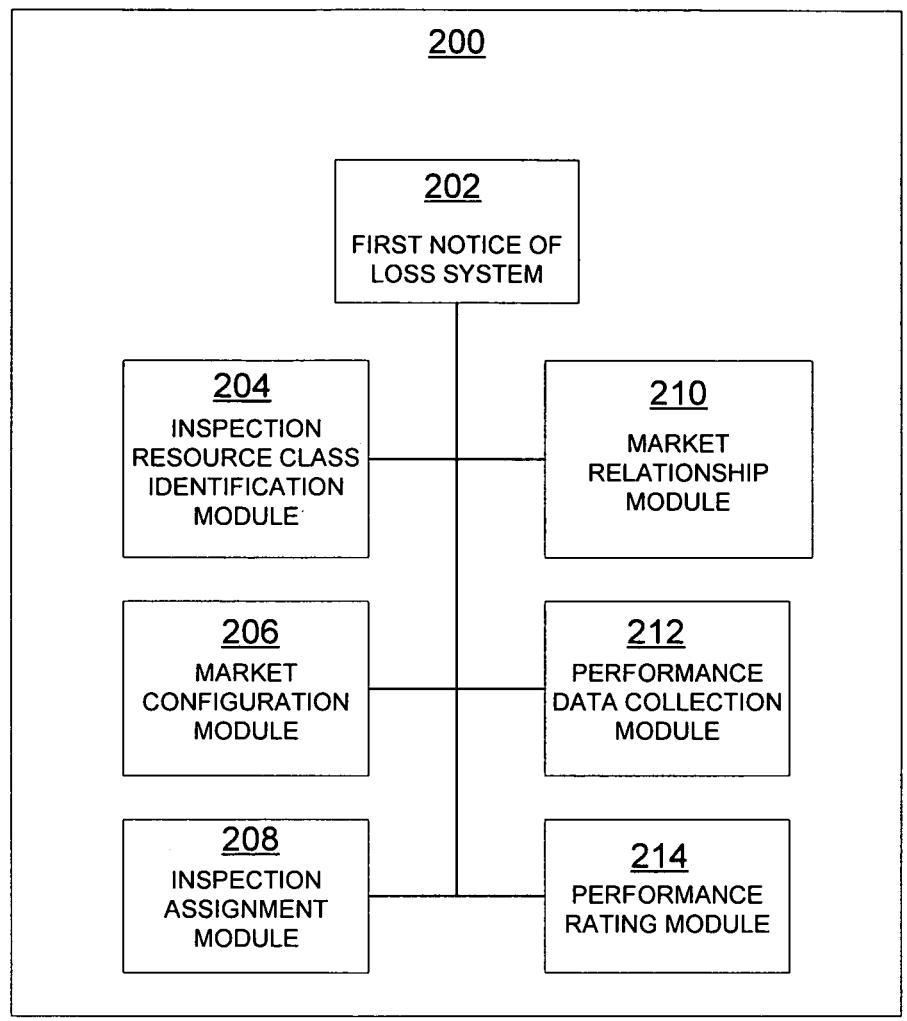
FIG. 2 illustrates a schematic block diagram of computer modules that may be used to recommend a service provider to inspect damaged property.

FIG. 2 illustrates an embodiment similar to that in FIG. 1 but specifically related to vehicle insurance claims. In FIG. 2, a customer provides information about a vehicle insurance claim to the insurance company through a FNOL system 202. As noted earlier, the customer may provide this information to the insurance company by various means.

The FNOL system 202 is used to collect and manage information about the loss, particularly information provided by the customer. The FNOL system 202 provides the inspection resource class (IRC) identification module 204 with information about the loss such as vehicle make, model, and year; type and extent of damage, and the current location of the vehicle. The IRC identification module 204 may also gather information from other systems and modules, such as policy information. The IRC identification module 204 then uses predefined business rules to identify a suitable IRC. As used herein, IRCs include, but are not limited to, resources that may inspect a vehicle or other damaged property. Examples of IRCs include repair shops, drive-in centers, field adjusters, field inspection centers (FICs), independent adjusters, and other classes of entities or individuals that may be involved in or knowledgeable of inspection of vehicles or other property. One skilled in the art will understand that other IRCs are possible and envisioned in accordance with the invention. Additional details regarding the identification of a suitable IRC are found in U.S. application Ser. No. 11/361,346, filed Feb. 24, 2006, which is incorporated by reference in its entirety herein.

The IRC identification module 204 provides the market configuration module 206 with information that includes specification of an IRC suitable for inspecting the vehicle and may also include other information needed to configure a local market of inspection resources such as, but not limited to, geographic location of the customer's residence; vehicle make, model, and year; type and extent of damage; and other information described earlier with respect to configuring a local market. If an IRC identification module 204 indicates that a repair shop is a suitable IRC, the market configuration module 206 may query the market relationship module 210 to identify all service providers in the global market that are repair shops and meet other local market entry criteria.

The remaining modules in FIG. 2, i.e., inspection assignment module 208, performance data collection module 212, and performance rating module 214, operate in a manner similar to the like titled modules described with respect to FIG. 1. Therefore, for the sake of brevity these modules are not described again.

Figure 3:
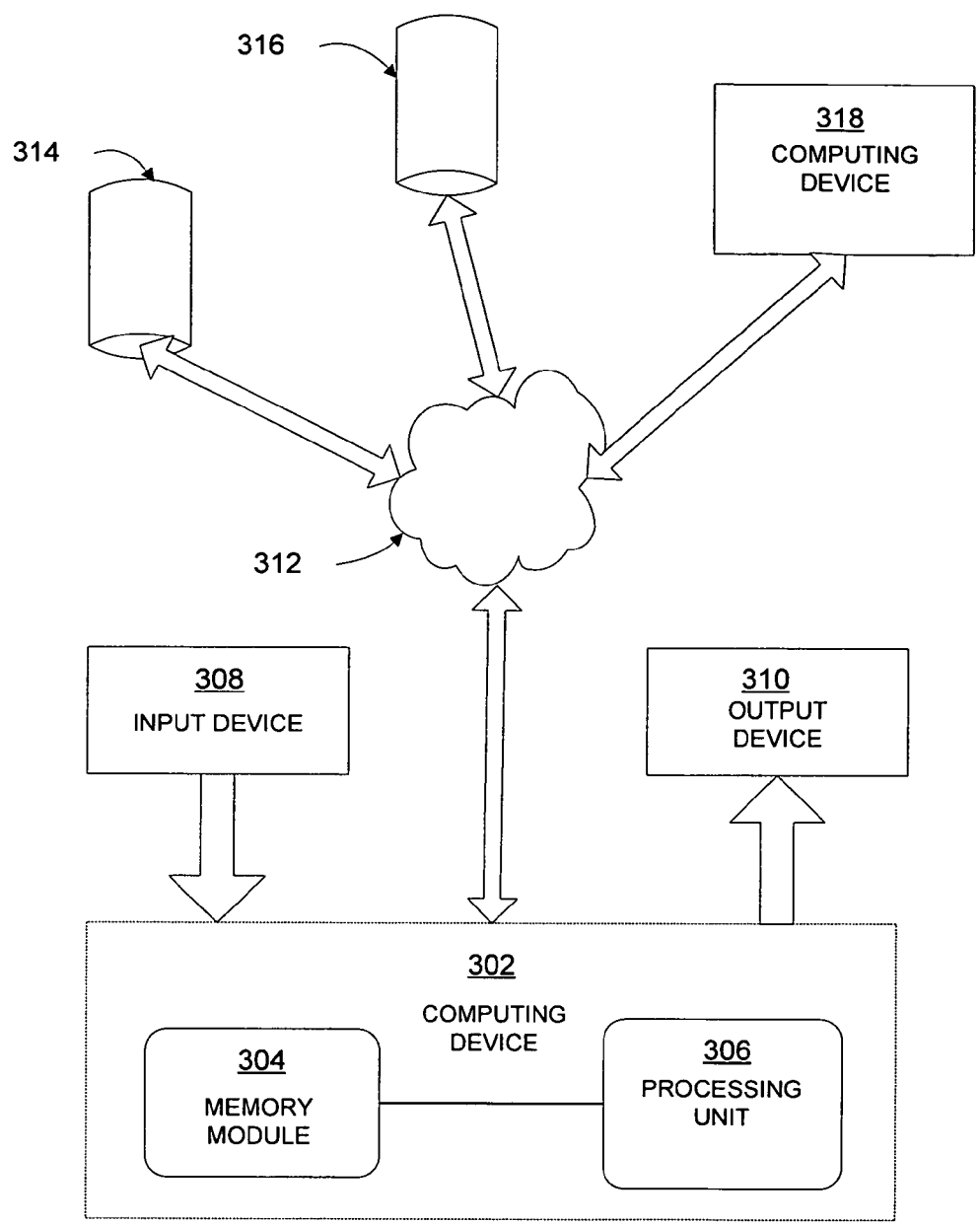
FIG. 3 depicts a simplified system diagram of various devices that may be used in accordance with aspects of the invention.

FIG. 3 depicts a simplified system diagram of various components and/or data sets that may be used in accordance with one or more aspects of the present invention. Thus, FIG. 3 illustrates an example of a suitable operating environment in which various aspects of the invention may be implemented. The operating environment is only one example of a suitable operating environment and is not intended to suggest any limitation as to the scope of use or functionality of the invention. A computing device 302 is depicted with a processing unit 306 and a memory module 304. The memory module 304 may comprise any type of memory and may be located locally, remotely or both remotely and locally. Similarly, the processing unit 306 may be located locally, remotely, or a combination of locally and remotely. Thus, the depicted computing device 302 may be considered a functional depiction of the mentioned components and is not intended to be limiting with respect to physical construction and/or the location of the various components that make up the computer device 302. It is noted that the modules depicted in FIGS. 1 and 2 may comprise computer executable instructions that may be stored in the memory module 304 of the computing device 302. However, one or more of the modules depicted in FIGS. 1 and 2 may also be stored with a data set.

The computing device 302 may have one or more input devices 308, such as a keyboard, mouse, microphone, touchpad or any other known input device configured to receive information from a user, and one or more output devices 310 such as a display screen or speaker to provide the information to a user. As is known, additional components such as communication interfaces, speech recognition engines and the like may also be included but are not depicted for purposes of clarity.

The computing device 302 may be in communication, either continuously or intermittently to one or more data sets 314, 316 through a communication network, which is depicted by network cloud 312. The communication between the computing device 302 and the data sets 314, 316 may be wired or wireless through known communication protocols such as Ethernet or CDMA or the like. The communication may be over a local area network and/or a wide area network, such as the Internet and may be accomplished securely through the use of known technologies such as a virtual private network (VPN). Computing devices and other devices may be connected to one or more of the networks via any known medium (or combination of media) useful for transmitting data, including but not limited to, twisted pair wires, coaxial cable, fiber optics and radio waves.

Data set 316 may be a company owned or third-party owned (or some combination thereof) database containing, for example, customer satisfaction information, shop performance data, quality metrics data, or other information. Meanwhile, data set 314 may contain service provider information, service provider performance data, business rules, or other information in accordance with aspects of the invention. Additional data sets may be added and the depicted data set may be combined as desired. As can be appreciated, the data sets may comprise one or more servers controlling access to data in a known manner. As the accessing of data sets such as databases is known, additional details are not disclosed for the purpose of brevity.

Computing device 318 may be a device similar to computing device 302 or may have more limited capabilities. For example, the computing device 318 may be an Internet kiosk or a handheld device (such as a phone or a PDA) or a typical PC. In an embodiment, a self-service customer may use computing device 318 to communicate with the computing device 302 so as to obtain a recommendation and select a service provider. In an alternative embodiment, the computing device 318 may be used by a representative aiding the customer.

Figure 4:
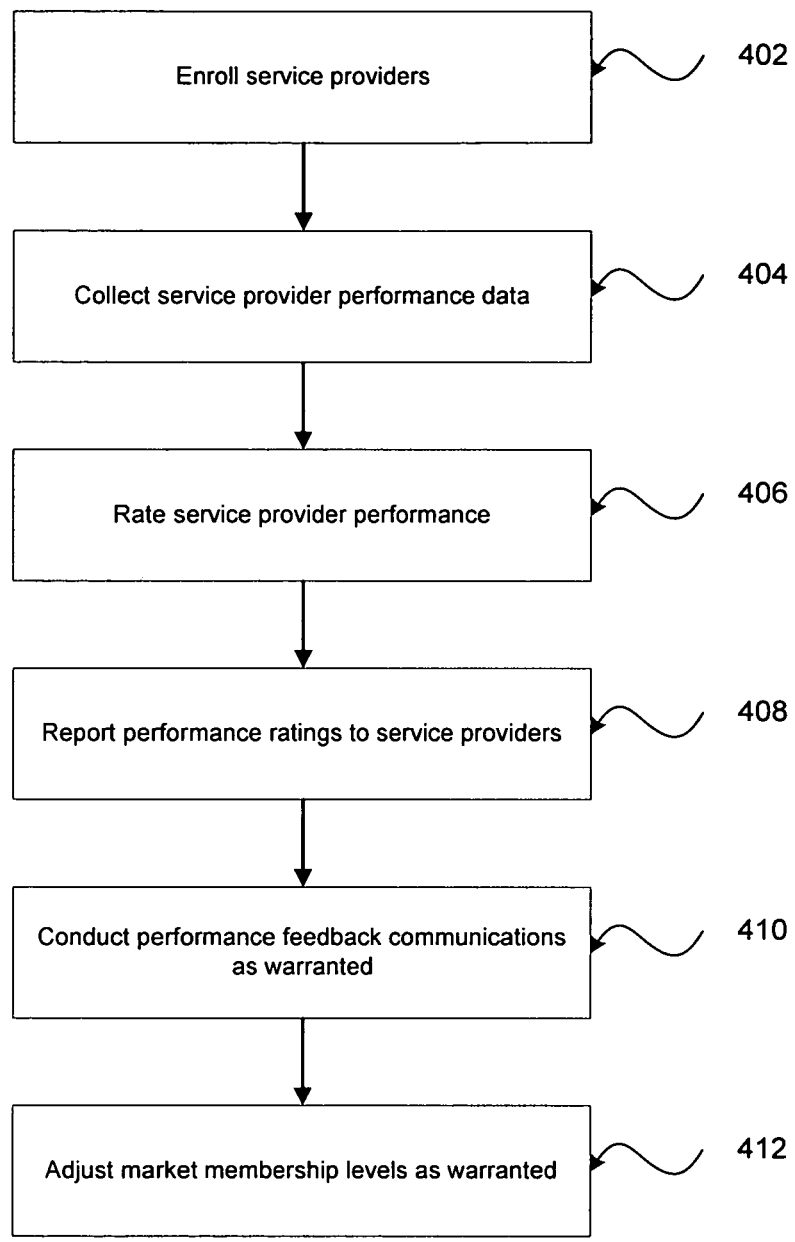
FIG. 4 shows a flowchart of a method for managing a relationship with a service provider in accordance with aspects of the invention.

FIG. 4 illustrates an embodiment of a method for managing an insurance company's relationship with a service provider and may be used in accordance with the MRM systems depicted in FIG. 1 (or 2). In step 402, service providers are enrolled. As can be appreciated, certain requirements may need to be met before a service provider may enroll with the insurance company. For example, enrollment may require service providers to provide information such as: business name, address, phone, location and directions for customers, qualifications, proof of compliance with state and local business licensing requirements, certifications, awards, group memberships (such as consolidator membership for vehicle repair shops), list of specializations, information about the owners and key employees; and information required to perform billing, payment, or other transactions with the insurer electronically through standard processes such as electronic data interchange (EDI) and electronic funds transfer (EFT). The type of information needed may be guided by business rules.

The enrollment process may take place through a variety of mechanisms. In an embodiment, a prospective service provider may fill out an enrollment application over the Internet. As can be appreciated, a new service provider may fill out an enrollment application over the Internet using a computing device 318 to access a web site provided by the insurance company that links to the market relationship module 108. Any other known method of providing the requisite information may be used such as providing information by phone to a call center representative or voice recognition system, filling out a paper, and sending it to the insurer by fax or postal mail or by filling out an electronic form and emailing it.

To become a participant in the insurer's global market, the service provider must comply with the terms of agreement. The service provider may indicate that it accepts and is able to comply with terms of agreement that may include: receiving service requests or assignments from the insurance company directly from an insurance company system or through a third-party system, providing estimates of work to the insurer, and using transactional processes such as EDI and EFT, as well as compliance with other business rules.

The insurer receives the service provider's enrollment application, which may have been automatically entered into market relationship module 108 when a service provider filled out the enrollment application over the internet, and enters the data, if required, into the market relationship module 108. In an embodiment, the module 108 may check the enrollment information to verify that it is complete and correctly entered. In an embodiment, the market relationship module 108 may apply business rules to the enrollment information to determine if the applicant meets predefined standards for entry into the global market. In an alternative embodiment, a representative of the insurer may review the enrollment information to determine if the applicant meets predefined standards for entry into the global market.

Once a service provider has been enrolled in the global market, service provider performance data is collected in step 404. The process of collecting service provider performance data may include establishing connections between one or more systems belonging to the insurer and one or more systems belonging to the service provider or third-party data providers. Sources of performance data may include, for example, insurance company systems, insurance company reports provided by one or more departments, service provider systems, third-party vendors, and customers. Examples of categories of performance data were described previously and the performance data may be obtained using the performance data collection module 110.

Next in step 406, the service provider performance is rated. In an embodiment, the performance rating module 112 may be used to compile data related to a given service provider. The performance rating module 112 may then calculate an overall rating based on a combination of one or more data elements or categories. As can be appreciated, the various categories may be weighted if certain categories are deemed more important than others. The weighting for different categories may be determined through known statistical methods such as regression so as to determine the appropriate weighted formula. It should be noted that a different weighted formula may be applied for each region or local market or one global formula may be used for all regions.

The performance rating module may also provide further ratings. In an embodiment, the performance rating module 112 calculates ratings for one or more categories of data in addition to an overall performance rating. In another embodiment, the module 112 calculates only ratings for different categories of data and does not calculate an overall rating for the service provider. The module 112 may also calculate performance ratings based on a combination of other calculated ratings and/or raw data. In an embodiment, the module 112 calculates a rating for each category of performance data and then calculates an overall rating based on predefined weights assigned to each category.

In an embodiment, the performance rating for a service provider for a given period of time is calculated as follows: first a performance rating module 112 queries a performance data collection module 110 for data collected in step 404; then the performance rating module 112 loads the performance data into a data set; next the module 112 calculates values for different categories of performance according to a predefined rating model for each category; then the module 112 calculates an overall rating for the service provider according to a rating model that assigns a weight to each performance category; and next the module 112 stores the ratings (for each category and overall) in a data set that includes ratings for all service providers globally.

Next in step 408, the insurance company may report performance ratings to service providers. As noted above, this feedback allows the service provider to determine which areas need improvement. The reporting may be accomplished by means an Internet application or web site where service providers may obtain information that may include their assignments, status of payment, and shop profile information. In addition, the web site may display the service provider's current rating and level information, which may be updated in real-time as information is communicated. The ranking may also be updated periodically. In addition, the service provider may use the web site to upload information to the insurance company that may include assignment status, photographs of damaged and/or repaired property, and other records.

The information provided in the reporting of the performance rating may include one or more of: an overall service rating, performance category ratings, other calculated values and raw data. Furthermore, the information may include a comparison of the service provider's ratings to standard ratings, historical ratings of the service provider, aggregated ratings of other service providers in a defined market, etc. In an embodiment, service providers may be provided a quarterly report that includes their overall performance rating, ratings for several performance categories, a summary of their ratings for the past year, and a comparison to the aggregate results of competitors in their local marketplace showing how the service provider ranks according to each performance category rating and an overall rating.

In step 410, the insurance company may supplement such reports of performance ratings with additional communications to encourage higher levels of performance from lower-rated service providers and to recognize and reinforce the performance of higher-rated service providers. Communication content may be different for service providers having different scores and may be customized for particular service providers. The communication may conducted by telephone, postal mail, email, or other means. One type of communication may include custom reports designed to educate the service provider about their performance relative to their competition. The reports may also identify areas of strength and needs for improvement.

In an embodiment, all service providers must sustain a minimum performance rating to be included in the local market configuration process (and thereby possibly be recommended by the insurance company). Service providers that fall below a minimum rating may continue to have participation status in the insurance company's global market but will not qualify for benefits associated with higher levels of participation, such as receiving recommendations. For example, the insurance company may define two or more levels of participation such as full participation and nominal participation, wherein nominal participation allows the service provider to input performance data but does not include the service providers in local market configurations. Levels of participation may be defined according to various forms of performance metrics such as current performance rating, average performance rating over a period of time, or ranking by performance rating in a specified market. Furthermore, levels of participation may be defined according to other variables, either instead of or in addition to performance ratings; examples include a minimum volume of service requests fulfilled for the insurer, and a minimum length of time in the insurer's global market.

Additional performance feedback may also be provided in step 410. In an embodiment, the additional performance feedback communications may include a warning that a service provider's full participation status is at risk due to current performance ratings. The performance feedback communications may provide insight into factors that affect the ratings. The performance feedback communication may also include target dates by which the ratings must meet a standard to maintain full participation status. The performance feedback communication of step 410 may also notify service providers when they can expect to meet the minimum standard to qualify for full participation status.

In step 412, adjustments to market participation levels are made. This may be performed by the market relationship module 108 that periodically performs the following tasks: query the performance rating module 112 to obtain performance rating data; apply predefined business rules to identify service providers whose performance warrants a change in participation level (higher or lower); implement those changes in the global market data set; and communicate the changes and relevant performance metrics to an insurance company representative or directly to the affected service providers.

In an embodiment, there may be three levels of participation. Level 1 participation may be used for new service providers who have enrolled and have a short tenure and/or transaction history. Short tenure may be a predetermined length of time that may include one week, one month, three months, six months, one year or some other period defined by the relevant business rule. Transaction history may include the number of assignments completed by the service provider over a defined period of time. Level 1 participation may also be used for service providers that are in the bottom quarter percentile of all the service providers in the geographical area with respect to their performance ratings. Level 2 participation may be used for service providers whose performance ratings are lower than the average of their peers in the past 12 months but above the threshold for level 1. Level 3 may be used for service providers whose performance ratings are at or above the average of their peers in the past 12 months. Recommendations for service providers may vary according to the level of participation. Level 1 service providers are not recommended but may perform services when requested by a customer, as is true of level 2 and 3 service providers. Level 2 service providers may be recommended to customers when no suitable service providers in level 3 are available. Level 3 service providers may be recommended when they appear suitable in terms of other local market entry criteria such as proximity to the customer, specializations, availability, etc.

In an embodiment, local markets are ranked within each level according to performance rating, with higher-rated service providers displayed before lower-rated peers and service providers with better levels being displayed before service providers with lower levels. As can be appreciated, this may mean that a high quality service provider is not recommended because its track record is too short. It should be noted, however, that customer are not required to use a recommended service provider and therefore may select such a service provider if they so choose. As can be appreciated, while three levels were described, additional levels may be utilized as desired. The use of additional levels may be desirable in regions of denser population where the number of repair shops is greater so that a more nuanced recommendation to potential customers can be provided.

Figure 5:
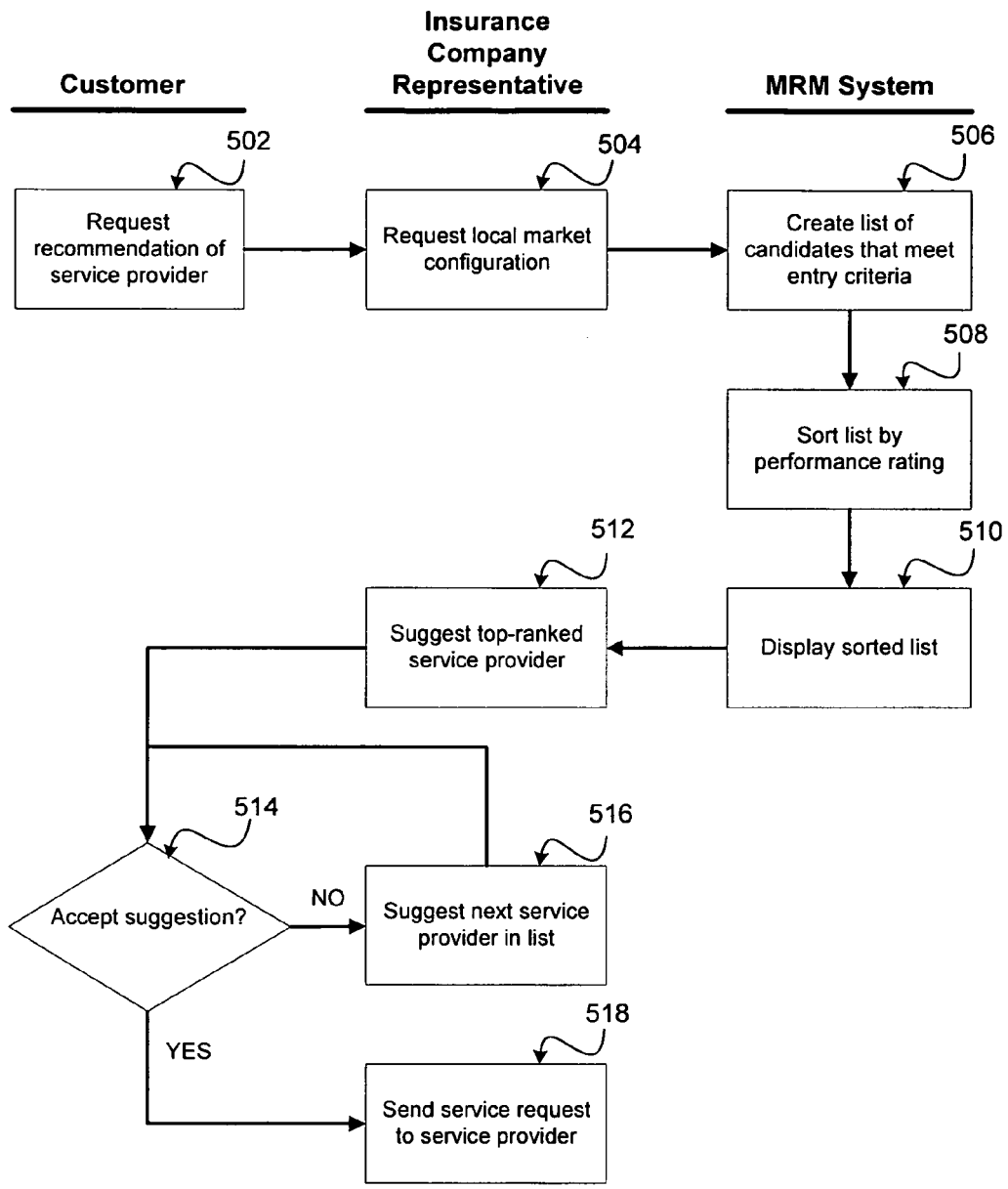
FIG. 5 shows a flowchart of a method for providing a recommendation of a service provider in accordance with aspects of the invention.

FIG. 5 illustrates a method for providing one or more recommendations of service providers to a customer for a given claim that may be accomplished with the MRM system 100 of FIG. 1. It should be noted that additional steps may be added and one or more of the depicted steps may be deleted as desired.

First in step 502, a customer requests a recommendation of a service provider by entering data into the FNOL system 102. In step 504, a request is provided to the MRM system 100 for a local market configuration to identify and rank service providers that meet entry criteria defined in part by the customer. For example, the local market entry criteria may require service providers to be located within a 10-mile radius of the customer's home.

It should be noted that steps 502 and 504 may be conducted in a kiosk system where the customer enters in data and selects a service provider without the need to confer with a company representative. Such a system could include a display and a user input interface that allows the customer to rapidly make a claim. Similar functionality may also be provided with an Internet application, using, for example, AJAX or a similar application. While current technology makes such an Internet based method most effective with conventional computers and a broadband or dial-up Internet connection, similar functionality may also be provided via a cell phone or PDA/cell phone combination. As can be appreciated, conventional Internet related methods would be well suited for applications related to damage to homes and businesses and phone-based methods would be suitable for all types of damage to all types of property. Such functionality could also be provided through a third-party service such as the OnStar service, although such a service may be more applicable to automotive applications where the use of OnStar is more prevalent. Regardless of the method, one potential advantage of the present invention is that company representatives do not have to be present in order for the customer to start the repair process. Thus, company representatives can invest more time in meeting with prospective insureds and in discussing methods of providing better services to individuals rather then focusing on entering the data associated with a customer's loss—although such data entry may be helpful for customers who do not have access to one of the more automated mechanisms.

In step 506, the MRM system then creates a list of candidates that meet the local market entry criteria. In an embodiment, this step may be a combination of the market configuration and the performance ratings determination discussed above. The list may include a variety of information about each service provider such as name, address, telephone numbers, email address, web site address, current performance rating, current performance category ratings (e.g., CSI, cycle time rating, etc.), capacity information, and availability information. This step may be done in substantially real time in response to the customer's request. Alternatively, a list of candidates that will be recommended may be updated periodically and the local market configuration may be based on location and other factors besides performance. As can be appreciated, real-time determination is advantageous because it can include the latest data and give the most up-to-date picture of the potential service providers. Thus, recent changes in the performance of service providers can be accounted for if real-time determination of the criterion is used.

In step 508, the service providers are sorted based on their performance rating. This sorting may include generating a performance score for each service provider with the use of a weighted formula and then sorting according to the aggregate value determined for each service provider. It should be noted that service providers may also be sorted based on additional factors such as availability, price, proximity and the like. Then in step 510, the list of service providers is displayed in order of rating to the representative. All the potential service providers may be provided at once or a portion of the list may be displayed, with the highest ranking service providers listed first.

Next in step 512, the highest rated service provider is recommended to the customer. In step 514 the customer decides whether to accept the suggestion. If the customer rejects the suggested service provider; the insurance company representative suggests the next service provider on the list in step 516 and the customer again decides whether to accept the recommended service provider. Steps 514 and 516 are repeated until the customer accepts a suggested service provider. Then, in step 518, the representative sends a service request or task assignment to the service provider.

It should be noted that, as discussed above, the portion of the method depicted as being accomplished by the representative may be automated so that the system automatically performs steps 504, 512, 516 and 518. As discussed above, this may be accomplished through a kiosk or a web site type interface, which may include a served application, with the use of a computing device 318 (FIG. 3).

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer-implemented method of recommending a service provider to an insurance customer, comprising:
    (a) receiving at a processing unit a first notice of loss from the customer, the first notice of loss including customer geographic data and service requirements data;
    (b) configuring at the processing unit a local market based on the customer geographic data and the service requirements data, wherein the configuring comprises determining at the processing unit whether the customer's policy requires use of a particular service provider;
    (c) determining at the processing unit a service provider performance rating for each service provider in the local market;
    (d) sorting at the processing unit the service providers based on the service provider performance rating; and
    (e) providing by the processing unit a recommendation of a service provider based on the sorted service providers, wherein providing a recommendation of a service provider in (e) further comprises:
        (i) identifying at the processing unit at least one case attribute for the first notice of loss;
        (ii) querying by the processing unit historical claim case files to identify desirable case outcomes for historical cases having the same at least one case attribute;
        (iii) determining by the processing unit a historical recommended service provider based on the query in (ii); and
        (iv) providing a recommendation of a service provider based on the service provider performance rating and the historical recommended service provider.

2. The method of claim 1, further comprising:
    (f) receiving at the processing unit a selection of a service provider from the customer.

3. The method of claim 2, further comprising:
    (g) providing by the processing unit a service request to the selected service provider's scheduling system.

4. The method of claim 1, wherein the sorting in (d) is further based on availability of the service providers.

5. The method of claim 1, wherein the determining in (c) is done in response to (b) and is done in substantially real time.

6. The method of claim 1, wherein the configuring in (b) further comprises:
    (i) determining at the processing unit service provider preferences for providing service.

7. The method of claim 1, wherein the local market is configured based on at least one criterion selected from the group consisting of geographic attributes, specific capabilities, equipment, training, specialization, manufacturing authorization, compliance with licensing requirements, price, affiliation with associations, service provider preferences, contractual agreements to provide a volume of service requests, and availability to perform within a specified timeframe.

8. The method of claim 1, wherein the determining in (c) further comprises:
    (i) determining at the processing unit an aggregate service provider performance rating with a weighted formula.

9. The method of claim 1, wherein the providing of the recommendation in (e) comprises:
    (i) causing by the processing unit a display of a first service provider with the highest performance rating; and
    (ii) in response to receiving, at the processing unit, a rejection of the first service provider, causing by the processing unit a display of a second service provider with the second highest performance rating.

10. The method of claim 1, further comprising:
    (f) providing feedback to a first service provider regarding the first service provider's performance rating relative to each service provider in the local market.

11. The method of claim 1, wherein the configuring a local market based on customer geographic data in (b) further comprises:
   (i) determining at the processing unit a distance between a customer-specified location and each service provider; and
   (ii) configuring the local market based on selecting the service providers that are located within an area defined by a circle whose center is the customer-specified location and whose radius is a specified distance.

12. A computer-readable medium having computer-executable instructions that when executed cause a computing device to perform a method of recommending a service provider to an insurance customer, comprising:
   (a) receiving at a processing unit a first notice of loss from the customer, the first notice of loss including customer geographic data and service requirements data;
   (b) configuring at the processing unit a local market based on the customer geographic data and the service requirements data, wherein the configuring comprises determining at the processing unit whether the customer's policy requires use of a particular service provider;
   (c) determining at the processing unit a service provider performance rating for each service provider in the local market;
   (d) sorting at the processing unit the service providers based on the service provider performance rating; and
   (e) providing by the processing unit a recommendation of a service provider based on the sorted service providers, wherein providing a recommendation of a service provider in (e) further comprises:
      (i) identifying at the processing unit at least one case attribute for the first notice of loss;
      (ii) querying by the processing unit historical claim case files to identify desirable case outcomes for historical cases having the same at least one case attribute;
      (iii) determining by the processing unit a historical recommended service provider based on the query in (ii); and
      (iv) providing a recommendation of a service provider based on the service provider performance rating and the historical recommended service provider.

13. The method of claim 12, further comprising:
   (f) providing feedback to a first service provider regarding the first service provider's performance rating relative to each service provider in the local market.

14. The method of claim 12, wherein the configuring a local market based on customer geographic data in (b) further comprises:
   (i) determining at the processing unit a distance between a customer-specified location and each service provider; and
   (ii) configuring the local market based on selecting the service providers that are located within an area defined by a circle whose center is the customer-specified location and whose radius is a specified distance.

* * * * *